United States Patent
Lee et al.

(10) Patent No.: US 11,254,310 B2
(45) Date of Patent: Feb. 22, 2022

(54) APPARATUS FOR CONTROLLING AUTONOMOUS DRIVING OF VEHICLE, SYSTEM INCLUDING THE SAME AND METHOD FOR THE SAME

(71) Applicants: HYUNDAI MOTOR COMPANY, Seoul (KR); KIA MOTORS CORPORATION, Seoul (KR)

(72) Inventors: Kyoung Jun Lee, Seoul (KR); Seung Joon Lee, Seoul (KR); Dong Gu Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 180 days.

(21) Appl. No.: 16/592,934

(22) Filed: Oct. 4, 2019

(65) Prior Publication Data
US 2020/0346646 A1 Nov. 5, 2020

(30) Foreign Application Priority Data

May 3, 2019 (KR) .......................... 10-2019-0052031

(51) Int. Cl.
| | |
|---|---|
| B60W 30/16 | (2020.01) |
| B60W 40/105 | (2012.01) |
| B60W 40/107 | (2012.01) |
| G05D 1/00 | (2006.01) |
| B60W 50/10 | (2012.01) |

(52) U.S. Cl.
CPC .......... *B60W 30/16* (2013.01); *B60W 40/105* (2013.01); *B60W 40/107* (2013.01); *B60W 50/10* (2013.01); *G05D 1/0088* (2013.01); *B60W 2520/105* (2013.01); *B60W 2554/80* (2020.02)

(58) Field of Classification Search
CPC combination set(s) only.
See application file for complete search history.

(56) References Cited

U.S. PATENT DOCUMENTS

| | | | |
|---|---|---|---|
| 7,668,638 B2* | 2/2010 | Saeki | B60W 10/10 701/96 |
| 11,034,345 B2* | 6/2021 | Correia | B60W 20/16 |
| 2010/0082215 A1* | 4/2010 | Miyajima | B60W 50/0097 701/93 |
| 2014/0277889 A1* | 9/2014 | Young | B60L 15/20 701/22 |
| 2016/0082963 A1* | 3/2016 | Slaton | B60W 30/146 701/93 |
| 2016/0176392 A1* | 6/2016 | Murata | B60W 30/1843 701/22 |

(Continued)

*Primary Examiner* — Jeff A Burke
*Assistant Examiner* — Madison B Emmett
(74) *Attorney, Agent, or Firm* — Lempia Summerfield Katz LLC

(57) ABSTRACT

A vehicle autonomous driving control apparatus for a vehicle includes: a processor that adjusts a control band for controlling an acceleration and a deceleration of the vehicle, based on a target acceleration and deceleration and an acceleration/deceleration response stage which sets a speed of responsiveness of the acceleration and deceleration of the vehicle to follow the target acceleration and deceleration; and a storage to store a driving pattern learning result calculated by the processor, the target acceleration and deceleration, and the control band.

18 Claims, 12 Drawing Sheets

(56) References Cited

U.S. PATENT DOCUMENTS

| | | | |
|---|---|---|---|
| 2017/0088136 A1* | 3/2017 | Seo | B60W 30/16 |
| 2017/0144660 A1* | 5/2017 | Kagerer | B60W 10/04 |
| 2017/0327116 A1* | 11/2017 | Heo | B60W 30/18018 |
| 2018/0178793 A1* | 6/2018 | Tokimasa | B60W 30/16 |
| 2019/0248369 A1* | 8/2019 | Mizuno | B60W 30/165 |
| 2020/0180614 A1* | 6/2020 | Goto | B62D 15/0265 |
| 2020/0290619 A1* | 9/2020 | Mehdi | B60W 60/0011 |

\* cited by examiner

APPARATUS FOR CONTROLLING AUTONOMOUS DRIVING OF VEHICLE, SYSTEM INCLUDING THE SAME AND METHOD FOR THE SAME

CROSS-REFERENCE TO RELATED APPLICATION

This application claims priority to and the benefit of Korean Patent Application No. 10-2019-0052031, filed on May 3, 2019, the entire contents of which are incorporated herein by reference.

FIELD

The present disclosure relates to an apparatus for controlling autonomous driving of a vehicle, a system including the same, and a method for the same, and more particularly to a technology of variously changing a control tendency of acceleration/deceleration of a vehicle.

BACKGROUND

The statements in this section merely provide background information related to the present disclosure and may not constitute prior art.

Various functions, such as autonomous driving, have been developed to assist a driver for the convenience of a user. Among the functions to assist a user, there is a smart cruise control (SCC) system to control a distance between a host vehicle and a proceeding vehicle, namely an inter-vehicle distance so as to uniformly maintain the inter-vehicle distance from the proceeding vehicle.

Since the SCC system has the item of a user setting menu (USM) representing a control response of an inter-vehicle distance, a driver may personally set the control response of SCC acceleration/deceleration in three stages of "fast", "normal", "slow".

FIG. 1 is a graph illustrating a required acceleration and a vehicle acceleration when conventionally controlling the autonomous driving of a vehicle. Referring to FIG. 1, the vehicle acceleration is controlled to follow the required acceleration transmitted from the apparatus for controlling the autonomous driving of the vehicle.

FIG. 2 is a graph illustrating the three response stages to control the required acceleration when conventionally controlling the autonomous driving of the vehicle. It may be recognized from FIG. 2 that the maximum value of the required acceleration is limited based on the response stages set by a user (e.g., a driver of the vehicle) using the apparatus for controlling the autonomous driving of the vehicle. In particular, the conventional SCC system calculates the maximum values of the required acceleration based on the response stages set by the user such that the maximum values vary and also are limited according to the response stages set by the user.

However, we have discovered that it is difficult for the user to feel the improved responsiveness through varying the maximum values of the required acceleration.

SUMMARY

An aspect of the present disclosure provides an apparatus for controlling autonomous driving of a vehicle, enabling a user to firmly feel the change in responsiveness of acceleration/deceleration by variously changing a control band, which is used for controlling the acceleration and deceleration of a vehicle, based on the acceleration/deceleration response stage of the apparatus for controlling the autonomous driving of the vehicle, a system including the same, and a method for the same.

The technical problems to be solved by the present inventive concept are not limited to the aforementioned problems, and any other technical problems not mentioned herein will be clearly understood from the following description by those skilled in the art to which the present disclosure pertains.

According to one form of the present disclosure, a vehicle autonomous driving control apparatus for a vehicle includes: a processor to vary a control band for controlling an acceleration and a deceleration of the vehicle, based on a required acceleration and deceleration (or a target acceleration, a target deceleration), which are used for controlling acceleration/deceleration of the vehicle, and an acceleration/deceleration response stage which sets a responsiveness of the acceleration and deceleration of the vehicle to follow the required acceleration and deceleration; and a storage to store a driving pattern learning result calculated by the processor, the required acceleration and deceleration, and the control band. The processor controls the acceleration and deceleration of the vehicle based on the adjusted control band and the required acceleration and deceleration.

According to one form, the processor may include receiving the acceleration/deceleration response stage by a user or calculating the acceleration/deceleration response stage based on a driving pattern learning result.

According to another form, the processor may include calculating the required acceleration and deceleration based on at least one of a speed set by the user, a distance to a preceding vehicle, or a relative speed of the preceding vehicle compared to the speed of the vehicle (e.g., a host vehicle).

According to one form, the processor may include setting a bandwidth of the control band to be equal to or greater than a first width, when the acceleration/deceleration response stage is a first stage, and setting the bandwidth of the control band to be a second width narrower than the first width, when the acceleration/deceleration response stage is a second stage which is faster than the first stage in response.

According to another form, the processor may include setting an upper limit value and a lower limit value of the control band based on the required acceleration and deceleration.

According to other form, the processor may set the upper limit value of the control band to be closer to the required deceleration than the lower limit value of the control band such that the responsiveness of the deceleration of the vehicle to follow the required deceleration increases.

In another form, the processor may set the lower limit value of the control band to be closer to the required acceleration than the upper limit value of the control band such that the responsiveness of the acceleration of the vehicle to follow the required acceleration becomes fast.

According to one form, the processor may include calculating the acceleration/deceleration response stage by reflecting the driving propensity of the user, when calculating the acceleration/deceleration response stage based on the driving pattern learning result.

According to another exemplary form, the processor may include setting the acceleration/deceleration response stage to be a fast following stage, and setting a width of the control band to be narrower, when the driving propensity of the user is wild.

In other form, the processor may include controlling the acceleration/deceleration or not controlling the acceleration/deceleration, depending on a difference value between the required acceleration and the vehicle acceleration.

According to another form, the processor may include: not controlling the acceleration/deceleration in a section that the difference value between the required acceleration and the vehicle acceleration is equal to or less than a preset reference value; and controlling the acceleration/deceleration in a section that the difference value between the required acceleration and the vehicle acceleration exceeds the preset reference value.

According to other form, the processor may include controlling the acceleration/deceleration to a strong extent or a weak extent based on the difference value between the required acceleration and the vehicle acceleration.

According to another form, the processor may include controlling the acceleration/deceleration to the weak extent in a section that the difference value between the required acceleration and the vehicle acceleration is equal to or less than a specific reference value, and controlling the acceleration/deceleration to the strong extent in a section that the difference value between the required acceleration and the vehicle acceleration exceeds the specific reference value.

According to one form of the present disclosure, a vehicle system for a vehicle may include: a user input device configured to receive an input of an acceleration/deceleration response stage which sets a speed of responsiveness of an acceleration of the vehicle to follow a target acceleration; and a vehicle autonomous driving control apparatus to vary a control band based on the target acceleration and the acceleration/deceleration response stage, where the control band is configured to control the acceleration of the vehicle, and the control apparatus controls the acceleration of the vehicle based on the control band and the target acceleration.

According to another form of the present disclosure, a method for controlling autonomous driving of a vehicle may include: adjusting, by a processor, of the vehicle, a control band for controlling an acceleration and a deceleration of the vehicle, based on a target acceleration and a target deceleration, and an acceleration/deceleration response stage which is configured to set a speed of responsiveness of the vehicle acceleration and deceleration to follow the target acceleration and deceleration; and controlling, by the processor, the acceleration/deceleration of the vehicle based on the control band and the target acceleration/deceleration.

According to another form, the method may further include receiving, by the processor, the target acceleration/deceleration response stage from a user or calculating the acceleration/deceleration response stage based on a driving pattern learning result.

In one form, the method may further include calculating, by the processor, the target acceleration and deceleration based on at least one of a speed set by the user, a distance to a preceding vehicle from the host vehicle, or a relative speed of the preceding vehicle to the host vehicle.

According to one form, the adjusting the control band may include setting a bandwidth of the control band to be equal to or greater than a first width, when the acceleration/deceleration response stage is a first stage, and setting the bandwidth of the control band to be a second width narrower than the first width, when the acceleration/deceleration response stage is a second stage in which the responsiveness is faster than in the first stage in response.

According to another form, the varying of the control band may include setting an upper limit value and a lower limit value of the control band based on the target acceleration and deceleration; setting the upper limit value of the control band to be closer to the target deceleration than the lower limit value of the control band such that the responsiveness of the deceleration of the vehicle to follow the target deceleration increases; and setting the lower limit value of the control band to be closer to the required acceleration than the upper limit value of the control band such that the responsiveness of the acceleration of the vehicle to follow the target acceleration increases.

According to another form, the calculating the acceleration/deceleration response stage may include calculating the acceleration/deceleration response stage by reflecting driving propensity of the user of the vehicle, when calculating the acceleration/deceleration response stage based on a driving pattern learning result.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
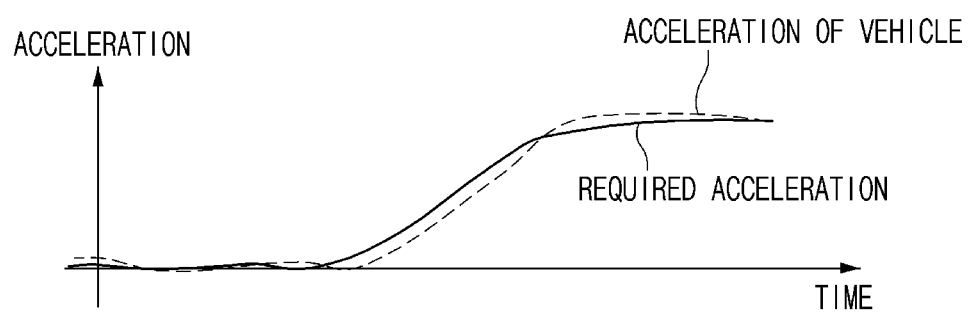
FIG. 1 is a graph illustrating a required acceleration and a vehicle acceleration when conventionally controlling the autonomous driving of a vehicle.
Figure 2:
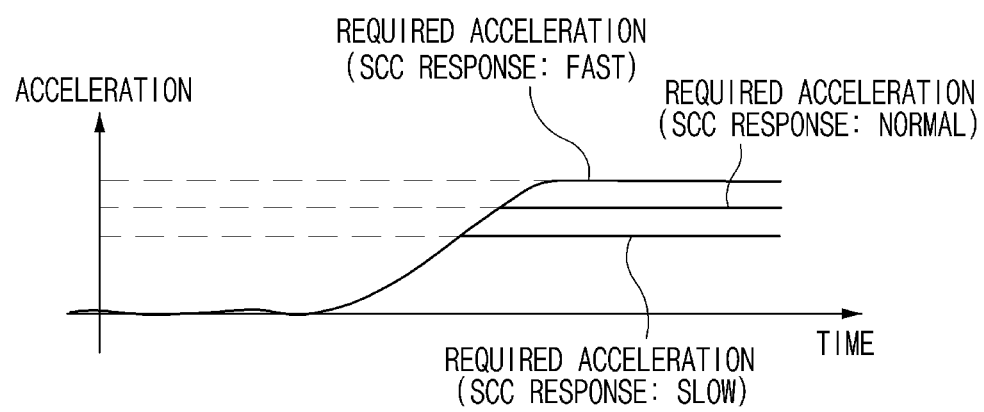
FIG. 2 is a graph illustrating the response stage of the required acceleration when conventionally controlling the autonomous driving of the vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In adding the reference numerals to the components of each drawing, it should be noted that the identical or equivalent component is designated by the identical numeral even when they are displayed on other drawings. Further, in describing exemplary forms of the present disclosure, a detailed description of well-known features or functions will be ruled out in order not to unnecessarily obscure the gist of the present disclosure.

In describing the components of the forms according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a technique for differentiating acceleration/deceleration control by varying a control band, based on the setting of an acceleration/deceleration response stage in a smart cruise control (SCC) system.

Hereinafter, exemplary forms of the present disclosure will be described in detail with reference to FIGS. 3 to 12.

Figure 3:
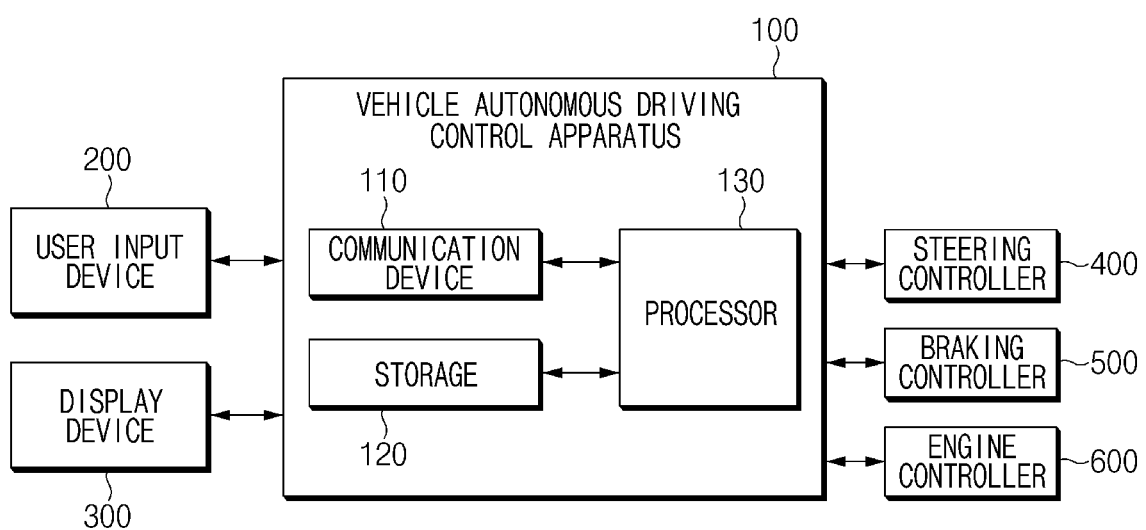
FIG. 3 is a block diagram illustrating components of a vehicle system including an apparatus for controlling the autonomous driving of a vehicle.

FIG. 3 is a block diagram illustrating the components of a vehicle system including an apparatus (hereinafter, referred to as "a vehicle autonomous driving control apparatus") for controlling the autonomous driving of a vehicle, according to one form of the present disclosure.

Referring to FIG. 3, a vehicle system may include a vehicle autonomous driving control apparatus 100, a user input device 200, a display 300, a steering controller 400, a braking controller 500, and an engine controller 600.

The vehicle autonomous driving control apparatus 100 may receive an acceleration/deceleration response stage set by a user or calculate the acceleration/deceleration response stage based on a driving pattern learning result, may vary a control band based on a required acceleration and deceleration, namely a target acceleration and deceleration, and the acceleration/deceleration response stage, and may control the acceleration/deceleration of the vehicle based on the required acceleration and deceleration and the control band.

In this case, the acceleration/deceleration response stage may be set in multiple-stages of "fast", "normal", and "slow", and the control band refers to an acceleration and deceleration range, which are set to have an upper limit value and a lower limit value for controlling the vehicle acceleration and deceleration, of the vehicle autonomous driving control apparatus 100. For example, when the vehicle autonomous driving control apparatus 100 sets the lower limit value of a vehicle acceleration, which is to be controlled, to 5 m/s$^2$, and the upper limit value of the vehicle acceleration to 10 m/s$^2$, the vehicle acceleration may be controlled in the range of the control band of 5 m/s$^2$ to 10 m/s$^2$. Accordingly, the vehicle autonomous driving control apparatus 100 may not control the vehicle acceleration to be less than 5 m/s$^2$ or to exceed 10 m/s$^2$, based on the control band.

The vehicle autonomous driving control apparatus 100 may include a communication device 110, a storage 120, and a processor 130.

The communication device 110 is a hardware device implemented with various electronic circuits to transmit and receive a signal through wireless or wired connection. According to the present disclosure, the communication device 110 may make in-vehicle communication through controller area network (CAN) communication or local interconnect network (LIN) communication.

The storage 120 may store a driving pattern learning result calculated by the processor 130, an algorithm for learning, a calculated required acceleration and deceleration, and a control band. The storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and an optical disk-type memory.

The processor 130 may be electrically connected with the communication device 110 and the storage 120, may electrically control each component, and may be an electric circuit that executes software commands. Accordingly, the processor 130 may perform various data processing and calculation, to be described below.

The processor 130 may vary a control band for controlling the vehicle acceleration and deceleration, based on a required acceleration and a required deceleration, which are used for controlling acceleration/deceleration of the vehicle, and an acceleration/deceleration response stage, which sets a responsiveness speed allowing the vehicle acceleration and deceleration to follow the required acceleration and deceleration, and may control the acceleration/deceleration of the vehicle based on the control band and the required acceleration and deceleration.

The processor 130 may receive the acceleration/deceleration response stage from the user or may calculate the acceleration/deceleration response stage based on the driving pattern learning result.

The processor 130 may calculate the required acceleration and deceleration based on at least one of the speed set by the user, the distance to the preceding vehicle, or the relative speed of the preceding vehicle.

When the acceleration/deceleration response stage is the first stage (slow), the processor 130 may set the bandwidth of the control band to be equal to or greater than a first width (wider). When the acceleration/deceleration response stage is a second stage which is faster than the first stage in response, the processor 130 may set the bandwidth of the control band to be a second width (narrower) which is narrower than the first width.

The processor 130 may set the upper limit value and the lower limit value of the control band, based on the required acceleration and deceleration. The processor 130 may set the width of the upper region, which is based on the upper limit value of the control band, to be narrower, to rapidly perform the deceleration following based on the acceleration/deceleration response stage. The processor 130 may set the width of the lower region, which is based on the lower limit value of the control band, to be narrower, to rapidly perform the acceleration and deceleration following based on the acceleration/deceleration response stage.

When calculating the acceleration/deceleration response stage based on the driving pattern learning result, the processor 130 may calculate the acceleration/deceleration response stage by reflecting the driving propensity of the user.

The processor 130 sets the acceleration/deceleration response stage to be a fast following stage and sets the width of the control band to be narrower, when the driving propensity of the user is wild. The processor 130 sets the acceleration/deceleration response stage to be a slow following stage and sets the width of the control band to be wider, when the driving propensity of the user is mild.

The processor 130 may or may not control the acceleration/deceleration, depending on the difference value between the required acceleration and the vehicle acceleration. In other words, the processor 130 may not control the acceleration/deceleration in a section that the difference value between the required acceleration and the vehicle acceleration is equal to or less than a preset reference value, and may control the acceleration/deceleration in a section that the difference value between the required acceleration and the vehicle acceleration exceeds the preset reference value.

The processor 130 may control the acceleration/deceleration to a strong extent or a weak extent, depending on the difference value between the required acceleration and the vehicle acceleration. In other words, the processor 130 may control the acceleration/deceleration to the weak extent in the section that the difference value between the required acceleration and the vehicle acceleration is equal to or less than the preset reference value, and may control the acceleration/deceleration to the strong extent in the section that the difference value between the required acceleration and the vehicle acceleration exceeds the preset reference value.

In this case, although the present disclosure has been described in that the acceleration/deceleration of the vehicle is controlled by the processor 130 by way of example, the acceleration/deceleration of the vehicle may be controlled based on an electronic stability control (ESC) and an engine management system (EMS) in a vehicle. The ESC may receive the required acceleration and deceleration, calculate the required engine torque, and perform deceleration control based on the required acceleration and deceleration.

The user input device 200 may receive an input of an acceleration/deceleration response stage from a user, and may receive the input, for example, through a switch, a button, or a touch pad.

The display 300 may display information on the autonomous driving of the vehicle. The display 300 may be implemented with a head up display (HUD), a cluster, or an audio video navigation (AVN). In addition, the display 300 may include at least one of a liquid crystal display (LCD), a thin film transistor-liquid crystal display (TFT LCD), a light emitting diode (LED), an organic light-emitting diode (OLED), an active matrix OLED (AMOLED), a flexible display, a bended display, or a third dimension (3D) display. Among them, some displays may be implemented with transparent displays configured in a transparent type or a light transparent type such that the displays are viewed from the outside. In addition, the display 300 is implemented with a touchscreen including a touch panel to be used as an input device in addition to an output device.

The steering controller 400 may be configured to control the steering angle of the vehicle, and may include a steering wheel, an actuator operating together with the steering wheel, and a controller to control the actuator.

The braking controller 500 may be configured to control the braking of the vehicle, and may include a controller to control a brake.

The engine controller 600 may be configured to control the engine driving of the vehicle, and may include a controller to control the speed of the vehicle.

Figure 4:
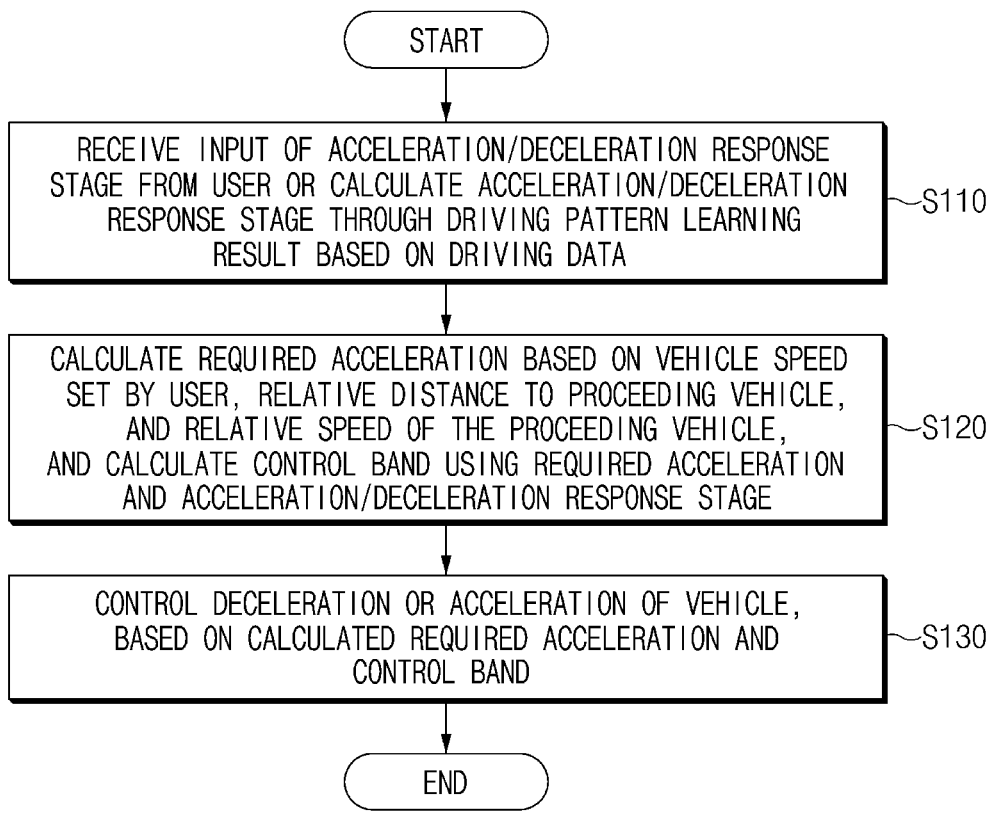
FIG. 4 is a flowchart illustrating a method for controlling autonomous driving of a vehicle to vary the control band for acceleration/deceleration.

Hereinafter, a method for controlling the autonomous driving of the vehicle to vary the control band for acceleration/deceleration will be described in detail with reference to FIG. 4, according to an form of the present disclosure. FIG. 4 is a flowchart illustrating the method for controlling the autonomous driving of the vehicle to vary the control band for acceleration/deceleration, according to one form of the present disclosure.

The following description will be made on the assumption that the vehicle autonomous driving control apparatus 100 of FIG. 3 performs a process of FIG. 4. In addition, in the following description made with reference to FIG. 4, it may be understood that the operation described as being performed by the vehicle autonomous driving control apparatus 100 is controlled by the processor 130 of the vehicle autonomous driving control apparatus 100.

Referring to FIG. 4, the vehicle autonomous driving control apparatus 100 may receive an input of an acceleration/deceleration response stage from a user or may calculate the acceleration/deceleration response stage through a driving pattern learning result based on driving data (S110).

When the user personally sets the acceleration/deceleration response stage, the acceleration/deceleration response stage may be input from the user through the user input device 200 such as a switch. In this case, the acceleration/deceleration response stage may be set to multiple-stages of "fast", "normal", and "slow", and may be linked to the setting of a drive mode.

When the acceleration/deceleration response stage is set through the learning, the acceleration/deceleration response stage may be calculated by training the driving propensity of the user, and may be calculated using continuous numeric values or relative numeric values.

The vehicle autonomous driving control apparatus 100 may calculate a required acceleration and deceleration for controlling the autonomous driving of the vehicle, based on a vehicle speed set by a user, the relative distance to the proceeding vehicle, and the relative speed of the proceeding vehicle, and may calculate a control band using the required acceleration and deceleration and the acceleration/deceleration response stage (S120).

For example, when the acceleration/deceleration response stage is set to "slow" by the user, the control band may be set to ±1.0 $m/s^2$ based on the required acceleration and deceleration. When the acceleration/deceleration response stage is "normal", the control band may be set to ±0.5 $m/s^2$ based on the required acceleration and deceleration. When the acceleration/deceleration response stage is "fast", the control band may be set to ±0.1 $m/s^2$ based on the required acceleration and deceleration. As described above, the vehicle autonomous driving control apparatus 100 may vary the control band based on the acceleration/deceleration response stage.

In other words, the vehicle autonomous driving control apparatus 100 may set the control band to be wider when the acceleration/deceleration response stage is set to "slow", and may set the control band to be narrower when the acceleration/deceleration response stage is set to "fast."

For another example, when calculating the control band by calculating the acceleration/deceleration response stage based on the driving propensity of the user, the size of the control band may be calculated by multiplying a control band reference value by a response weight.

In this case, the vehicle autonomous driving control apparatus 100 may set the control band reference value to ±1 m/s², ±2 m/s², or the like, and the control band reference value may be determined based on the variable range. In addition, the response weight, which is a relative numeric value, may be set in the range of 0 to 1 or 0 to 100, and may be set by determining the driving propensity of the user as a relative stage. For example, in the case of a user having a wilder driving propensity, the response weight may be set to a higher value. In the case of a user having a milder driving propensity, the response weight may be set to a lower value. In this case, when the response weight is the higher value, the width of the control band is widened. When the response weight is the lower value, the width of the control band is narrowed.

The vehicle autonomous driving control apparatus 100 controls the acceleration or deceleration of the vehicle, based on the calculated required acceleration and deceleration and control band (S130).

In this case, the vehicle autonomous driving control apparatus 100 may or may not control the acceleration/deceleration, depending on the difference value between the required acceleration and the vehicle acceleration, in the control band. In addition, the vehicle autonomous driving control apparatus 100 may control the acceleration/deceleration to the strong extent or the weak extent, depending on the degree of the difference value between the required acceleration and the vehicle acceleration.

Hereinafter, the method for controlling acceleration or deceleration depending on the variation of the control band will be described in detail with reference to FIGS. 5 to 10. In this case, the vehicle acceleration is the measured actual acceleration of the vehicle, and the required acceleration is the speed information for the vehicle control by the vehicle autonomous driving control apparatus 100. In other words, the vehicle autonomous driving control apparatus 100 controls the vehicle acceleration to approximate the required acceleration.

Figure 5:
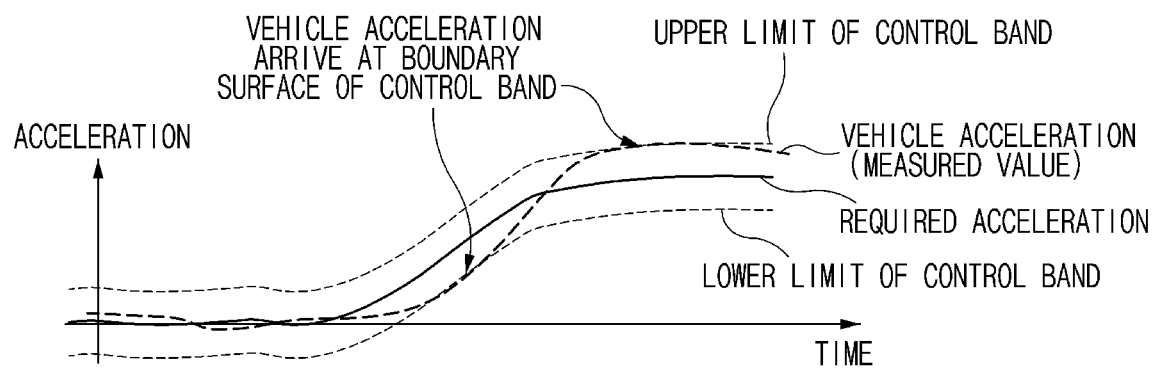
FIG. 5 is a graph illustrating an acceleration/deceleration control response when a wider control band is applied.

FIG. 5 is a graph illustrating the acceleration/deceleration control response when the wider control band is applied, according to one form of the present disclosure.

As illustrated in FIG. 5, when the control band is set to be a wider value, a speed (control response) allowing the vehicle acceleration to follow the required acceleration become down. In other words, based on the required acceleration, an upper limit of a control band is drawn above the graph of the required acceleration and a lower limit of the control band is drawn below the graph of the required acceleration. A bandwidth has a specific size from the graph of the required acceleration. It may be understood that the wider bandwidth indicates the setting of a wider control band.

FIG. 5 illustrates the setting of the wider control band by way of example, in which the vehicle acceleration is controlled in the control band, and the control response of the acceleration of the vehicle is slow down. For example, the control band may be set to be in the range of +5 m/s to −5 m/s based on the required acceleration.

Figure 6:
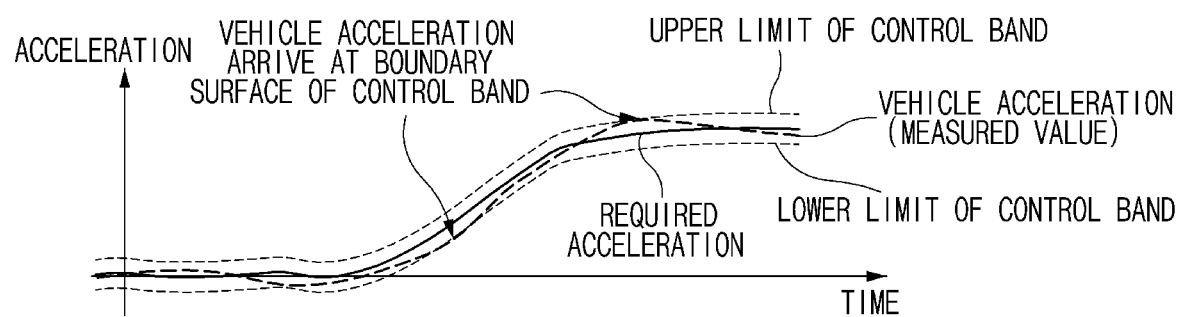
FIG. 6 is a graph illustrating an acceleration/deceleration control response when a narrower control band is applied.

FIG. 6 is a graph illustrating the acceleration/deceleration control response when a narrower control band is applied, according to one form of the present disclosure.

Referring to FIG. 6, the vehicle autonomous driving control apparatus 100 sets the control band to be narrower by way of example, in which the control band is set to be narrower based on the graph of the required acceleration. Accordingly, the vehicle acceleration is controlled within the control band set to be narrower. The upper limit of the control band and the lower limit of the control band become closer to the required acceleration so the control response becomes faster.

Figure 7:
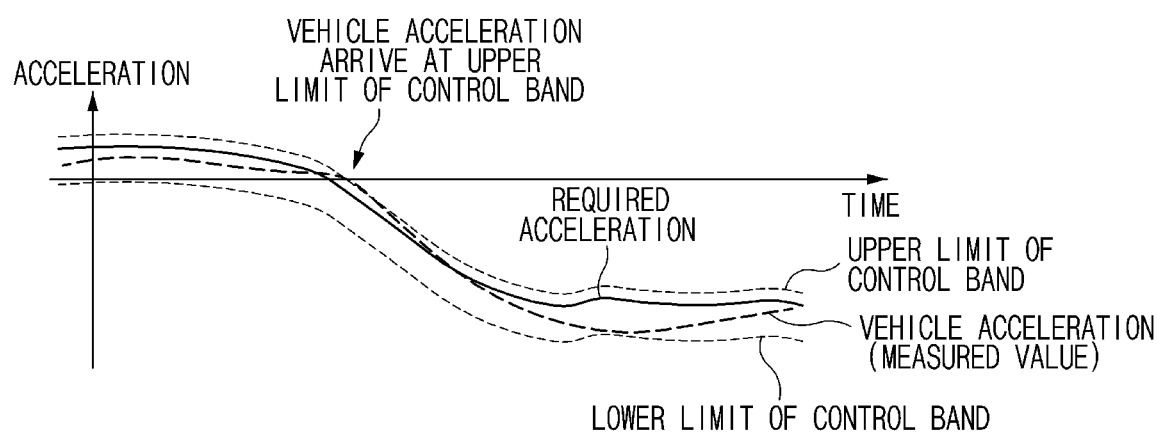
FIG. 7 is a graph illustrating an acceleration/deceleration control response when an upper region of the control band is narrower.

FIG. 7 is a graph illustrating an acceleration/deceleration control response when an upper region of the control band is narrower, according to one form of the present disclosure.

Referring to FIG. 7, the lower limit of the control band is set to be far away from the required acceleration and the upper limit of the control band is set to be closer to the required acceleration. Accordingly, the upper region, which is above the required acceleration, of the control band is set to be narrower and the lower region, which is below the required acceleration, of the control band is set to be wider.

As described above, when the upper region of the control band is set to be narrower, the deceleration following performance of the vehicle may be speeded up.

Figure 8:
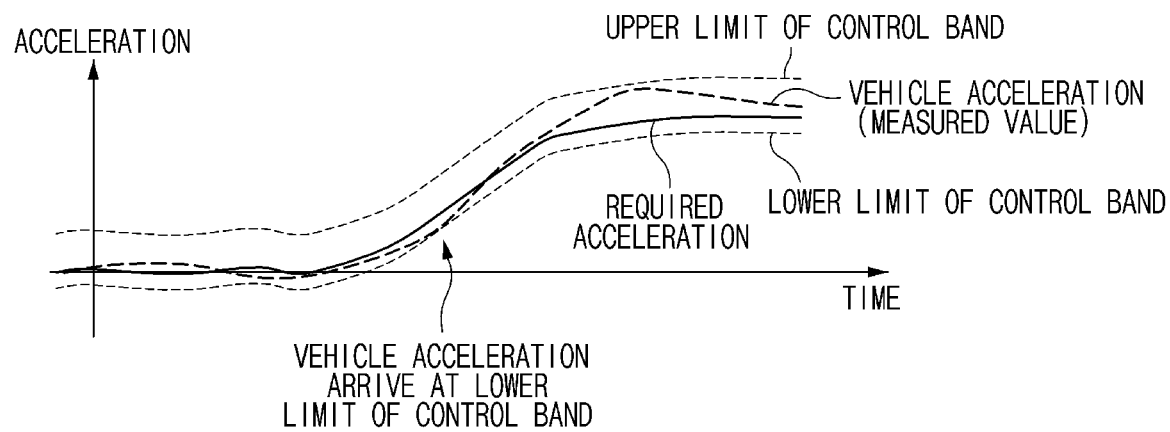
FIG. 8 is a graph illustrating an acceleration/deceleration control response when the lower region of the control band is narrower.

FIG. 8 is a graph illustrating the acceleration/deceleration response when the lower region of the control band is narrower, according to one form of the present disclosure.

Referring to FIG. 8, the lower limit of the control band is set to be closer to the required acceleration and the upper limit of the control band is set to be far away from the required acceleration. Accordingly, the region, which is above the required acceleration, of the control band is set to be wider and the region, which is below the required acceleration, of the control band is set to be narrower.

As described above, when the lower region of the control band is set to be narrower, the acceleration following performance of the vehicle may be boosted.

Figure 9:
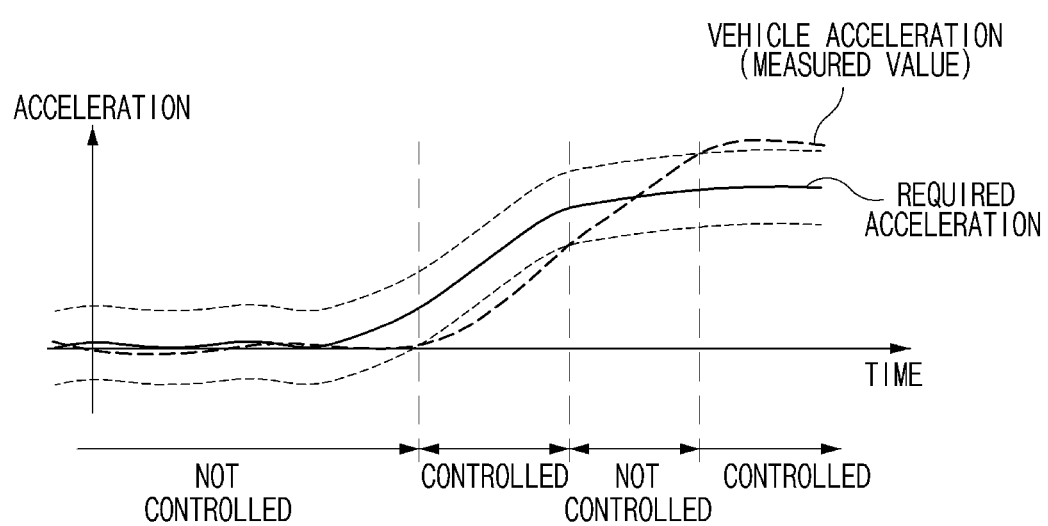
FIG. 9 is a graph illustrating the variable control of acceleration/deceleration within or out of the control band.

FIG. 9 is a graph illustrating the variable control of acceleration/deceleration within or out of the control band, according to another form of the present disclosure.

Referring to FIG. 9, the vehicle autonomous driving control apparatus 100 does not control acceleration/deceleration in the section that the measured acceleration of the vehicle is similar to the required acceleration, controls the acceleration of the vehicle in the section that the acceleration of the vehicle is less than the required acceleration, and controls the deceleration of the vehicle in the section that the acceleration of the vehicle is greater than the required acceleration.

The vehicle autonomous driving control apparatus 100 does not perform the acceleration/deceleration control in the section in which the vehicle acceleration becomes greater than the required acceleration as the acceleration of the vehicle continuously increases in the state that the vehicle acceleration is smaller than the required acceleration.

Figure 10:
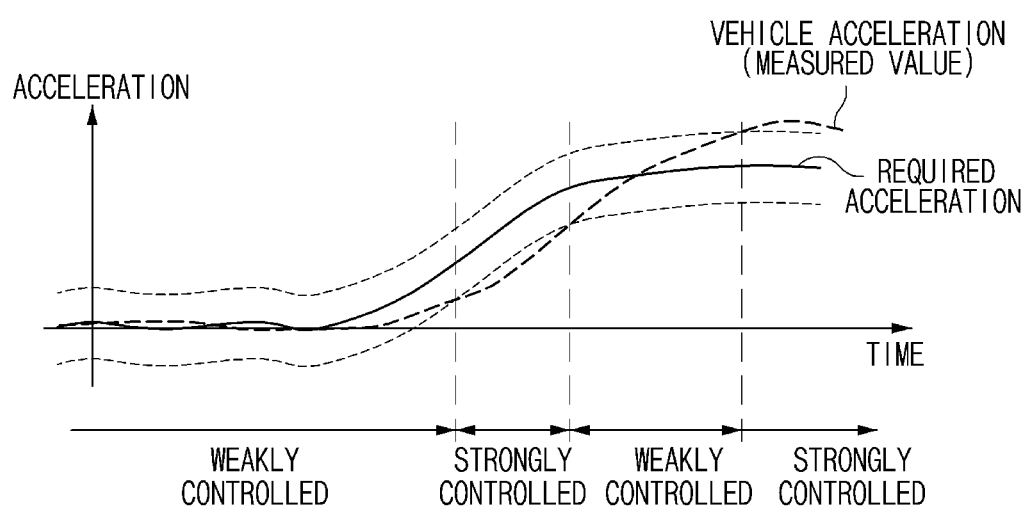
FIG. 10 is a graph illustrating that the acceleration/deceleration control is performed by variously applying a control gain within and out of a control band.

FIG. 10 is a graph illustrating that the acceleration/deceleration control is performed by variously applying a control gain within and out of the control band, according to another form of the present disclosure.

Referring to FIG. 10, the vehicle autonomous driving control apparatus 100 performs the acceleration/deceleration control to a weak extent in the section that the vehicle acceleration is similar to the required acceleration, performs the acceleration control a strong extent in the section that the vehicle acceleration is smaller than the required acceleration, and performs the deceleration control to a strong extent in the section that the vehicle acceleration is greater than the required acceleration.

The vehicle autonomous driving control apparatus 100 may perform the acceleration/deceleration control to the weak extent in the section that the vehicle acceleration becomes greater than the required acceleration as the vehicle acceleration continuously increases in the state that the acceleration of the vehicle is smaller than the required acceleration.

Figure 11A:
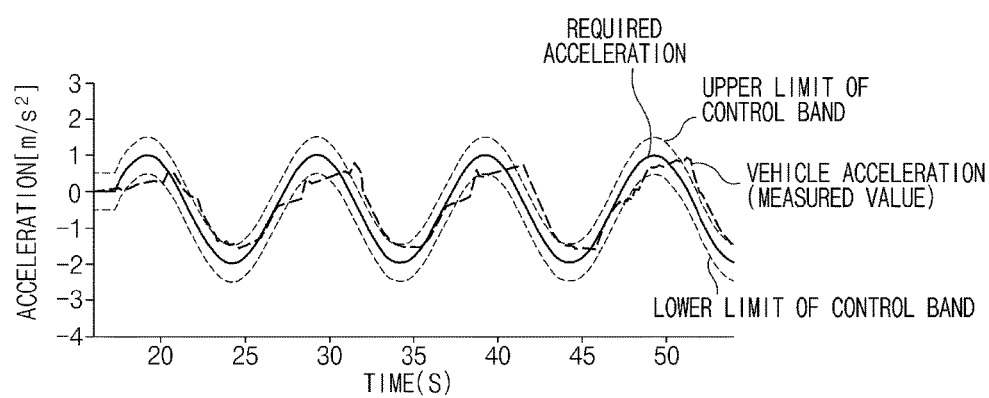
FIGS. 11A and 11B are graphs illustrating the differentiation in acceleration/deceleration control based on the setting of response when controlling autonomous driving of a vehicle.
Figure 11B:
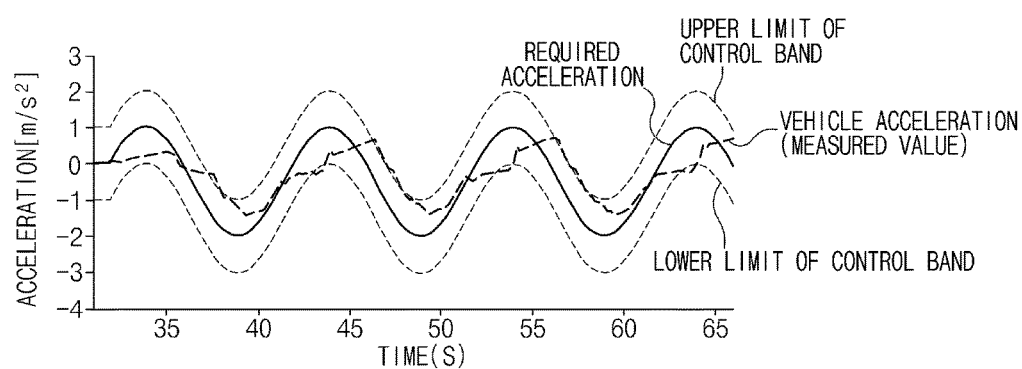

FIGS. 11A and 11B are graphs illustrating the differentiation in acceleration/deceleration control based on the settings of response when controlling the autonomous driving of the vehicle, according to an form of the present disclosure.

In FIG. 11A, the vehicle acceleration is controlled within the control band set based on the required acceleration, and when the control band gets narrower, a response becomes faster. In comparison, FIG. 11B illustrates that when the control band is wider, and a response gets slower.

As described above, the present disclosure enables a user to firmly feel the change in control response by variously changing a control band, which is used for controlling the acceleration of a vehicle, based on the response stage of the apparatus for controlling the autonomous driving of the vehicle, thereby increasing the feeling of the satisfaction of the user.

Figure 12:
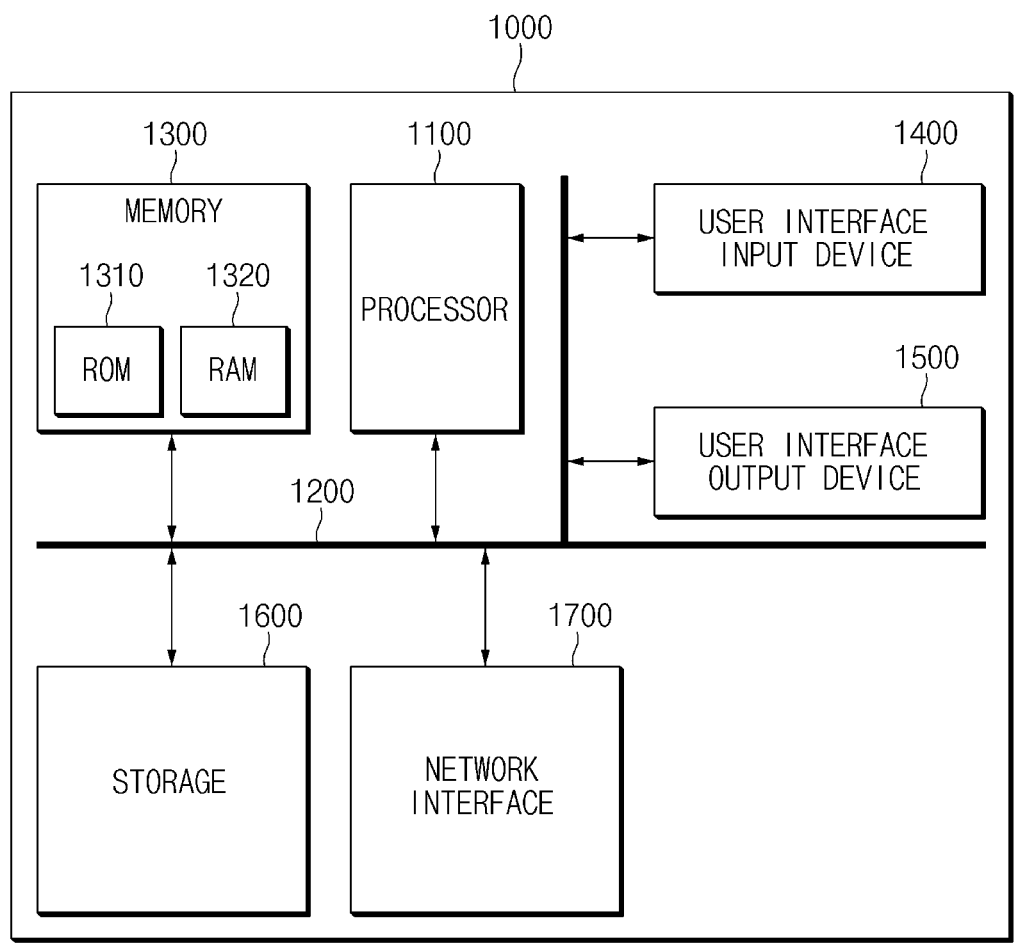
FIG. 12 is a block diagram illustrating a computing device.

FIG. 12 is a block diagram illustrating a computing device according to one form of the present disclosure.

Referring to FIG. 12, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the forms disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, exemplary forms of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

As described above, the present disclosure enables a user to firmly feel the change in control response of acceleration/deceleration by variously changing a control band, which is used for controlling the acceleration and deceleration of a vehicle, based on the acceleration/deceleration response stage of the apparatus for controlling the autonomous driving of the vehicle, thereby increasing the feeling of the satisfaction of the user.

Besides, a variety of effects directly or indirectly understood through the present disclosure may be provided.

What is claimed is:

1. An apparatus for controlling autonomous driving of a vehicle, the apparatus comprising:
a processor configured to:
adjust a control band for controlling an acceleration and a deceleration of the vehicle, based on a required acceleration and deceleration, and an acceleration/deceleration response stage which is the acceleration and deceleration of the vehicle to follow the required acceleration and deceleration, and
control the acceleration and deceleration of the vehicle based on the adjusted control band and the required acceleration and deceleration,
set a bandwidth of the control band to be equal to or greater than a first width, when the acceleration/deceleration response stage is a first stage; and
set the bandwidth of the control band to be a second width narrower than the first width, when the acceleration/deceleration response stage is a second stage in which the responsiveness is faster than in the first stage; and
a storage configured to store at least one of the acceleration/deceleration response stage which is received from a user or calculated by the processor, the required acceleration and deceleration, or the control band.

2. The apparatus of claim 1, wherein the processor is configured to calculate the acceleration/deceleration response stage based on a driving pattern learning result.

3. The apparatus of claim 1, wherein the processor is configured to:
calculate the required acceleration and deceleration based on at least one of a speed set by the user, a distance to a preceding vehicle, or a relative speed of the preceding vehicle to the vehicle.

4. The apparatus of claim 1, wherein the processor is configured to:
set an upper limit value and a lower limit value of the control band, based on the required acceleration and deceleration.

5. The apparatus of claim 1, wherein the processor is configured to:
calculate the acceleration/deceleration response stage by reflecting driving propensity of the user, when calculating the acceleration/deceleration response stage based on a driving pattern learning result.

6. The apparatus of claim 5, wherein the processor is configured to:
set the acceleration/deceleration response stage to be a fast following stage; and
set a width of the control band to be narrower, when the driving propensity of the user is wild.

7. The apparatus of claim 1, wherein the processor is configured to:
determine whether to control the acceleration and deceleration of the vehicle or not based on a difference value between the required acceleration and the acceleration of the vehicle.

8. The apparatus of claim 7, wherein the processor is configured to:

determine not to control the acceleration and deceleration of the vehicle in a section that the difference value between the required acceleration and the acceleration of the vehicle is equal to or less than a specific reference value; and determine to control the acceleration and deceleration in a section that the difference value between the required acceleration and the acceleration of the vehicle exceeds the specific reference value.

9. The apparatus of claim 1, wherein the processor is configured to:

control the acceleration and deceleration of the vehicle to a strong extent or a weak extent, based on a difference value between the required acceleration and the acceleration of the vehicle.

10. The apparatus of claim 9, wherein the processor is configured to:

control the acceleration and deceleration of the vehicle to the weak extent in a section that the difference value between the required acceleration and the acceleration of the vehicle is equal to or less than a specific reference value; and control the acceleration and deceleration to the strong extent in a section that the difference value between the required acceleration and the acceleration of the vehicle exceeds the specific reference value.

11. An apparatus for controlling autonomous driving of a vehicle, the apparatus comprising:

a processor configured to:

adjust a control band for controlling an acceleration and a deceleration of the vehicle, based on a required acceleration and deceleration, and an acceleration/deceleration response stage which is the acceleration and deceleration of the vehicle to follow the required acceleration and deceleration, and control the acceleration and deceleration of the vehicle based on the adjusted control band and the required acceleration and deceleration; and a storage configured to store at least one of the acceleration/deceleration response stage which is received from a user or calculated by the processor, the required acceleration and deceleration, or the control band, wherein the processor is further configured to:

set the upper limit value of the control band to be closer to the required deceleration than the lower limit value of the control band such that the responsiveness of the deceleration of the vehicle to follow the required deceleration increases.

12. An apparatus for controlling autonomous driving of a vehicle, the apparatus comprising:

a processor configured to:

adjust a control band for controlling an acceleration and a deceleration of the vehicle, based on a required acceleration and deceleration, and an acceleration/deceleration response stage which is the acceleration and deceleration of the vehicle to follow the required acceleration and deceleration, and control the acceleration and deceleration of the vehicle based on the adjusted control band and the required acceleration and deceleration; and a storage configured to store at least one of the acceleration/deceleration response stage which is received from a user or calculated by the processor, the required acceleration and deceleration, or the control band, wherein the processor is further configured to:

set the lower limit value of the control band to be closer to the required acceleration than the upper limit value of the control band such that the responsiveness of the acceleration of the vehicle to follow the required acceleration increases.

13. A vehicle system for a vehicle, the system comprising:

a user input device configured to receive an input of an acceleration/deceleration response stage which is a speed of responsiveness of an acceleration of the vehicle to follow a target acceleration; and a vehicle autonomous driving control apparatus configured to:

adjust a control band based on the target acceleration, and the acceleration/deceleration response stage, the control band configured to control the acceleration of the vehicle, control the acceleration of the vehicle based on the control band and the target acceleration, set a bandwidth of the control band to be equal to or greater than a first width, when the acceleration/deceleration response stage is a first stage, and set the bandwidth of the control band to be a second width narrower than the first width, when the acceleration/deceleration response stage is a second stage in which the responsiveness is faster than in the first stage.

14. A method for controlling autonomous driving of a vehicle, the method comprising:

adjusting, by a processor of the vehicle, a control band for controlling an acceleration and a deceleration of the vehicle, based on a target acceleration and a target deceleration, and an acceleration/deceleration response stage which is a speed of responsiveness of the acceleration and deceleration of the vehicle to follow the target acceleration and deceleration; and controlling, by the processor, the acceleration and deceleration of the vehicle based on the control band and the target acceleration and deceleration, wherein adjusting the control band includes:

setting a bandwidth of the control band to be equal to or greater than a first width, when the acceleration/deceleration response stage is a first stage; and setting the bandwidth of the control band to be a second width narrower than the first width, when the acceleration/deceleration response stage is a second stage in which the responsiveness is faster than in the first stage.

15. The method of claim 14, further comprising:

receiving, by the processor, the acceleration/deceleration response stage from a user or calculating the acceleration/deceleration response stage based on a driving pattern learning result.

16. The method of claim 15, wherein calculating the acceleration/deceleration response stage includes:

calculating the acceleration/deceleration response stage by reflecting driving propensity of the user.

17. The method of claim 14, further comprising:

calculating, by the processor, the target acceleration and deceleration based on at least one of a speed set by the user, a distance to a preceding vehicle from the vehicle, or a relative speed of the preceding vehicle to the vehicle.

18. A method for controlling autonomous driving of a vehicle, the method comprising:

adjusting, by a processor of the vehicle, a control band for controlling an acceleration and a deceleration of the vehicle, based on a target acceleration and a target deceleration, and an acceleration/deceleration response stage which is a speed of responsiveness of the acceleration and deceleration of the vehicle to follow the target acceleration and deceleration; and controlling, by the processor, the acceleration and deceleration of the vehicle based on the control band and the target acceleration and deceleration, wherein adjusting the control band includes:

setting an upper limit value and a lower limit value of the control band based on the target acceleration and deceleration;

setting the upper limit value of the control band to be closer to the target deceleration than the lower limit value of the control band such that the responsiveness of the deceleration of the vehicle to follow the target deceleration increases; and setting the lower limit value of the control band to be closer to the required acceleration than the upper limit value of the control band such that the responsiveness of the acceleration of the vehicle to follow the target acceleration increases.

* * * * *